United States Patent Office 3,068,261
Patented Dec. 11, 1962

3,068,261
ORGANOMETALLIC REACTIONS
Paul Kobetz and Richard C. Pinkerton, Baton Rouge, La., assignors to Ethyl Corporation, New York, N.Y., a corporation of Delaware
No Drawing. Filed Feb. 1, 1960, Ser. No. 5,593
5 Claims. (Cl. 260—437)

This invention relates to organometallic reactions. More particularly, the invention relates to an organometallic reaction for the synthesis and generation of alkali metal-aluminum tetrahydrocarbon complexes and concurrent formation of boron trihydrocarbon compounds.

The complex tetrahydrocarbon compounds of alkali metals and aluminum, typified by sodium aluminum tetraethyl, are known generally, but methods for production of such materials leaves something to be desired. One method of manufacture involves the reaction of, for example, an alkali metal such as sodium with an aluminum trialkyl, which results in the formation of a sodium aluminum tetraalkyl. Unfortunately, this is undesirable because of the deposition of free aluminum metal which must be recovered and reused. A need thus has existed, generally, for an efficient process for the production of alkali metal tetrahydrocarbon complex compounds. A closely related problem has arisen because of the insolubility of such complex compounds in other metal alkyls, particularly the metal alkyls of the group IV–A metals, tin and lead. In certain electrolytic processes, aluminum alkyls are encountered admixed with, for example, lead tetra-alkyls, and such mixtures are quite difficult to separate into the respective components. Hence, an explicit need has existed for an efficient technique for selective conversion of aluminum trihydrocarbon compounds, in the presence of other metal alkyls, into alkali metal tetrahydrocarbon complex compounds which are immiscible or insoluble with such metal alkyls.

In addition to the foregoing, a need has been developed for an effective synthesis of alkali metal aluminum tetrahydrocarbon complexes wherein the hydrocarbon radicals are a plurality of types. For example, an efficient process has been needed for producing compounds such as sodium aluminum tetra-alkyl wherein one to three of the alkyl groups are methyl, and the other alkyl groups contain two or more carbon atoms.

A principal object of the present invention is to provide a new process and reaction for the rapid and effective manufacture of alkali metal-tetrahydrocarbon aluminum complexes. More particularly, an object of the present invention is to provide an effective and efficient process whereby such aluminum complex compounds can be efficiently produced from the readily available complex compounds consisting of alkali metal-boron tetraalkyl or tetrahydrocarbon compounds. A concurrent object is to provide for the concurrent release or generation of a boron trihydrocarbon product which is readily separated from the said alkali metal aluminum tetrahydrocarbon complexes. In certain forms of the invention, an additional object is to carry out the reaction of the present invention wherein an aluminum trihydrocarbon component, in admixture with an organo compound of a different metal, is selectively reacted therefrom to form a desired and readily separable alkali metal-aluminum tetrahydrocarbon complex. An additional object of certain embodiments of the process is to provide a process for the manufacture of alkali metal-aluminum tetrahydrocarbon complex compounds wherein a high degree of control is available with respect to the hydrocarbon radicals appearing in the product. Other objects will appear hereinafter.

In its broadest form, the present invention comprises reacting together a bimetal complex comprising an electropositive metal-boron-tetrahydrocarbon compound with an aluminum trihydrocarbon compound, and releasing or forming the desired alkali metal-aluminum tetrahydrocarbon complex and concurrently forming a boron trihydrocarbon product. In the most straightforward form of the present reaction, the hydrocarbon groups of the reactant boron containing complex and of the aluminum trihydrocarbon reactant are the same, and include alkyl or aryl, or substituted alkyl or substituted aryl radicals. The invention is not thus limited, however, and frequently the aluminum reactant will have radicals different than the radicals of the boron containing complex reactant. In addition, the hydrocarbon radicals need not be identical within the reactant compounds, but a plurality of different hydrocarbon radicals can be present within the molecule of the individual reactants.

In carrying out the reaction, the two reactants are mixed, preferably in a single phase system, although frequently heterogeneous phases will be involved, and the reaction mixture is heated, providing the desired reaction. In most instances, it appears that the aluminum trihydrocarbon reactant compound actually displaces, without undergoing change, a boron trihydrocarbon compound from its initial presence in a complex compound. In addition, in certain instances, there appears to be a further interchange of alkly groups between the thus formed boron trihydrocarbon material released and the aluminum trihydrocarbon reactant. This result is found and frequently deliberately utilized to advantage, particularly when the properties of the products, and the reactants, and the proportions of the reactants are such that an excess of the aluminum trihydrocarbon reactant is present and available for further reaction as such with the boron trihydrocarbon compound released.

In carrying out the reaction the precise proportions of the initial reactants are not highly critical, although generally it is preferred that the aluminum trihydrocarbon reactant be provided in quantity at least equal to, on a molar basis, the boron containing complex reactant. Dependent upon the properties, especially melting point, of the reactants, it is desirable or unnecessary, as the case may be, to provide a solubilizing material or a solvent for one or more of the reactants. Thus, an ether or a polyether of a polyglycol, or some similar organic medium is frequently employed in this fashion. Alternatively, in many instances, a relatively stable aromatic liquid hydrocarbon is highly desirable for a reaction medium or solvent.

Illustrative examples of products obtainable by the present process are sodium aluminum tetramethyl, sodium aluminum tetraethyl, and sodium aluminum tetraisobutyl. The jointly released or produced boron tri-hydrocarbon products include boron trimethyl, boron triethyl, boron tri-n-propyl. In addition to the foregoing illustrative examples, the present invention is applicable to production of numerous other joint products, as amplified hereinafter. Similar latitude is found with respect to the aluminum trihydrocarbon and the alkali metal-boron tetrahydrocarbon complex compounds as reactants.

The mode of carrying out the several embodiments of the invention will be fully understood from the examples and detailed description hereinafter. Except if otherwise stated, all parts are expressed as parts by weight.

*Example I*

In this operation a reaction mixture is prepared including 150 parts sodium boron tetraethyl, $NaB(C_2H_5)_4$ and 228 parts of aluminum triethyl, $Al(C_2H_5)_3$. The reactants are thus in the proportion of 1 mole of the sodium boron tetraethyl to 2 moles of the aluminum triethyl. No solvent is provided and the sodium boron tetraethyl is in a fine state of subdivision of about 20 mesh size or smaller.

The reaction mixture is agitated while raising the temperature to approximately 125° C., and the heating is accompanied by the vigorous evolution of a vapor, which upon condensation, is triethyl boron of a high degree of purity. A high degree of conversion of the limiting reactant, the sodium boron tetraethyl, is obtained. The reaction residue is a mixture of sodium aluminum tetraethyl and aluminum triethyl in approximately equimolal proportions. By cooling the mixture to approximately room temperature, the sodium aluminum tetraethyl product is crystallized as readily filterable solids.

A series of further operations are carried out, the reactants, products, and conditions of operation being given in the following summary table:

as a condensed liquid of relatively high purity. Concurrently, the treating reaction results in the formation of sodium aluminum tetraethyl which is immiscible and insoluble in the tetraethyllead, thus allowing separation by mechanical means such as sedimentation and/or filtration.

From the examples given above, it will be seen that the reactants, both the aluminum trihydrocarbon compound and the alkali metal boron tetrahydrocarbon complex compound, can be selected from a substantial number of compounds. Examples of the aluminum reactant, in addition to those already specifically illustrated, are aluminum triamyl, aluminum trihexyl, aluminum tridecyl, aluminum trioctyl, and other aluminum trialkyls in which the alkyl group has extended chain lengths of up to 16

| Ex. | Boron reactant | | Aluminum reactant | | Temperature of reaction ° C. | Solvent | Alkali metal-aluminum tetrahydrocarbon product | Boron trihydrocarbon product | Remarks |
|---|---|---|---|---|---|---|---|---|---|
| | Identity | Parts and moles | Identity | Parts and moles | | | | | |
| II | Lithium boron tetraethyl | 135 One | Aluminum triethyl | 342 Three | 100 | None | Lithium aluminum tetraethyl | Boron triethyl | Vaporize boron triethyl from reaction mixture; filter lithium aluminum tetraethyl from excess aluminum triethyl. |
| III | Sodium boron tetraethyl | 150 One | Aluminum trimethyl | 72 One | 60 | 150 parts toluene | Sodium aluminum trimethyl ethyl | _____do_____ | Feed aluminum trimethyl to reactor during reaction, operate at ½ atmosphere and withdraw boron triethyl as rapidly as formed. |
| IV | _____do_____ | 150 One | _____do_____ | 216 Three | 95 | None | Sodium aluminum tetraethyl | Boron trimethyl | Operate at one atmosphere, charge all reactants at start. |
| V | Sodium boron tetra-n-propyl | 206 One | Aluminum triethyl | 228 Two | 100 | _____do_____ | Sodium aluminum triethyl n-propyl compound | Boron triethyl-isopropyl compounds | Operate at ¼ atmosphere pressure. |
| VI | Sodium boron tetraphenyl | 332 One | Aluminum triisobutyl | 261 One | 190 | 500 parts biphenyl | Mixture sodium aluminum isobutyl phenyl compounds | Boron triphenyl and boron triisobutyl | Operates at ½ atmosphere; part of boron triphenyl distilled overhead, part dissolved in biphenyl. |
| VII | Potassium boron tetraethyl | 166 One | Aluminum tri-n-propyl | 156 | 125 | None | Potassium aluminum ethyl tri-n-propyl | Boron triethyl | Feed in aluminum tri-n-propyl slowly; withdraw boron triethyl as formed. |
| VIII | Sodium boron tetra-benzyl | 398 One | Aluminum triphenyl | 258 | 180 | 1,000 cc. toluene | Sodium aluminum triphenyl benzyl | Boron tribenzyl | Boron compound dissolved in toluene; operate under 2 atmosphere pressure. |

As previously indicated, one particular advantageous utility of the present reaction, in addition to the synthesis of the desired alkali metal aluminum tetrahydrocarbon complex compounds, and release of a boron trihydrocarbon compound, is the utilization of the reaction for the selective separation of organometallic mixtures which include aluminum trihydrocarbon compounds as a component, said trihydrocarbon compounds being otherwise difficultly resoluble or separable from the principal organometallic materials. An illustration of utilization of the present invention for this purpose is shown by the following example.

*Example IX*

In this operation, a mixture of tetraethyllead and triethyl aluminum is available, in the proportions of 42 weight percent tetraethyllead and 58 weight percent triethyl aluminum, this system being a single phase liquid mixture. It is possible, but quite difficult, to separate these components by careful fractionation under vacuum, but because of the relatively high boiling point of both the triethyl aluminum and the tetraethyllead, and the tendency of tetraethyllead to decompose at elevated temperatures, the separation by distillation is difficult.

One thousand parts of this mixture is used, the mixture also containing a fraction of a percent of a thermal stabilizer for the tetraethyllead, comprising naphthalene. The mixture is treated with 760 parts of sodium boron tetraethyl, at a temperature of about 100° C., and with vigorous agitation. Prompt reaction occurs between the triethyl aluminum and the sodium boron tetraethyl, resulting in release of boron triethyl, which is readily vaporized, at the temperature of operation, and is separately recoverable carbon atoms. The lower alkyl radicals are preferred, however, that is, those having from 1 to 4 carbon atoms. The hydrocarbon radicals need not be identical, on the molecule of the aluminum reactant, and in many instances two or even three different alkyl groups can be present on the aluminum reactant. Illustrative examples of such reactants are aluminum methyl diethyl, aluminum dimethyl ethyl, aluminum methyl di-isobutyl, aluminum di-n-propyl octyl, aluminum ethyl diamyl, aluminum diamyl hexyl, aluminum ethyl n-propyl butyl, and others. When the alkyl group exceeds two carbon atoms, it can be present in the aluminum reactant as the normal alkyl radical, or the bonding can be to a non-terminal carbon. In the case of, for example, an amyl radical, it can be present as a -2-amyl or a -3-amyl radical, in addition to the normal or -1-amyl radical. The alkyl radicals can also be branched as in the case of isobutyl and 2-methyl-1-butyl. Such branched chain radicals can also be bonded to the aluminum at the several possible positions. Thus, in the case of a -2-methyl-butyl radical, the bonding can be as the -2-methyl-1-butyl, -2-methyl-2-butyl, 3-methyl-2-butyl or -3-methyl-1-butyl radical. Further illustrations of suitable reactants, then, include aluminum tris-(3-methyl-2-butyl) and aluminum bis-(3-methyl-3-butyl)-3-methyl-1-butyl.

In addition to the aluminum trihydrocarbon reactants composed solely of aluminum, carbon and hydrogen, in certain instances the hydrocarbon radical can have halogen or pseudo halogen substituents. These instances are relatively not as important, but are fully operable. The employment of such reactants, for example, aluminum di-ethyl-(3-chloropropyl) and others, should be restricted to those instances in which the alkali metal of the alkali metal-boron tetrahydrocarbon complex is not sufficiently reactive to react with such combined halogen. Instances of this type of reaction are relatively infrequent, and most frequently involve cesium as the alkali metal constituent.

Extensive flexibility exists with respect to aluminum trihydrocarbon reactants in which the hydrocarbon radical is an aryl or substituted aryl group. In addition to the aluminum triphenyl illustrated in the preceding examples as a reactant, compounds such as aluminum trixylyl, aluminum tri-o-tolyl, aluminum trinaphthyl and others can be employed. Generally, the aluminum aryl or substituted aryl compounds are less significant and effective processing is somewhat more difficult because of the high melting points of these materials.

In addition to alkyl groups, as such, as hydrocarbon radicals, frequently alkyl groups with aryl substituents are used. Examples of these include the benzyl and -1-(2-phenylpropyl) radicals.

Similar flexibility exists with respect to the alkali metal boron tetrahydrocarbon reactant employed in the process. Illustrative examples of further compounds of this category include sodium boron-1-hexynyl triethyl, sodium boron tetracyclohexyl, sodium boron tetranaphthyl, sodium boron tetracyclohexenyl, sodium boron tetrabutadienyl, sodium boron ethyl triphenyl and the corresponding potassium, lithium, and cesium compounds.

It will be clear, from the numerous reactants available, that extensive latitude thus is available on the products which can be produced. The process thus is directed to preparation of alkali metal-aluminum tetrahydrocarbon complexes which can be represented by the expression $MAlR_4$, wherein M represents an alkali metal, and R includes the same and different hydrocarbon radicals. The hydrocarbon radicals thus include alkyl, aryl, and substituted alkyl and substituted aryl radicals, and also aliphatic radicals having some unsaturation therein. Further examples of complex products of the present process thus include sodium aluminum ethyl tri-hexyl, sodium aluminum ethyl tris(1 (2-phenyl) propyl), sodium aluminum methyl tri-isobutyl, potassium aluminum tetraethyl, potassium aluminum trimethyl ethyl, cesium aluminum tetraethyl, cesium aluminum methyl triethyl, sodium aluminum ethyl tris (3-(2-amyl)phenyl).

It will be apparent from the preceding examples that numerous embodiments, varying in detail, can be carried out within the scope of the present invention, as is discussed more fully below.

A variety of reaction techniques are available, as is illustrated in the preceding examples. The particular technique employed will depend to a great extent upon the normal conditions of the boron and aluminum reactants and desired products, that is, whether these are normally liquid, readily vaporizable, or solid materials. Thus, when the aluminum trihydrocarbon product employed as a reactant is a liquid of relatively high boiling point, as in Examples I and II, the aluminum reactant can be employed as the only liquid phase material present in the reaction zone, and in particular when an excess of the aluminum compound is provided. When this is the situation, it is highly desirable to provide the alkali metal boron tetrahydrocarbon complex compound, employed as a reactant, in finely comminuted or subdivided form, preferably of the size of 20 mesh particles or below, although this size distribution is not sacramental. In this situation it is customary to provide the reactants in the full proportions to be utilized, so that the aluminum trihydrocarbon component is present in its entirety, as a liquid phase, from the beginning of the reaction. However, as noted below, when the hydrocarbon radicals are different on the boron complex compound and the aluminum trihydrocarbon compound reactants, this technique will frequently result not only in release of a boron trihydrocarbon compound corresponding to the original boron complex compound, but will also frequently result in the interchange of the hydrocarbon radicals from the aluminum trihydrocarbon reactant to the boron trihydrocarbon compound resultant from the reaction. This is illustrated, for example, in Example V.

Another common reaction technique, therefore, involves the slow feeding of the aluminum trihydrocarbon reactant to a reaction mixture containing the boron complex component provided as a feed reactant. In such situations, particularly when the boron trihydrocarbon product is released as a material which is vaporized at the conditions of operation, the boron trihydrocarbon product can be withdrawn from contact with the other reactants as rapidly as it is formed by vaporizing, withdrawal and liquefication in a refrigerated condenser.

The reactants are desirably vigorously agitated throughout the reaction period, which can vary depending upon the quantity involved in a particular system, from a few minutes to several hours. Ordinarily, the rate of reaction is quite rapid and a total residence time of from about five minutes up to about an hour is usually fully adequate for the desired reaction.

Although the preceding examples and the above discussion of reaction techniques are principally with respect to what is customarily referred to as a batch type operation, the same principles will be applicable in continuous operations of a flow type character.

It will be apparent from the preceding examples that a wide latitude in temperature of reaction is permissible. The temperature should be sufficiently high to assure a high degree of fluidity and the desired rapid rate of reaction, but should not be so high that decomposition of reactants or products occurs. Higher temperatures are required for reactions involving boron or aluminum compounds having aryl or substituted aryl groups as these compounds generally have elevated melting points. It will be clear from the preceding examples that temperatures as low as about 50° and up to around 200° C., or even over, can be very expeditiously employed.

As with the temperature of the reaction, the pressure employed is subject to considerable flexibility. When the aluminum trihydrocarbon compound is present in low concentrations in the reaction system, and, in addition, has an appreciable vapor pressure, it will be desirable to operate at a reasonably elevated pressure of 2 to 5 atmospheres, for example, to assure that some of the aluminum trihydrocarbon reactant remains in the liquid phase and is available for reaction. However, the aluminum materials employed as reactants generally have a significantly higher boiling point than the boron trihydrocarbon products desired, hence pressure is seldom needed for this specific purpose. In fact, in many instances, it is preferred to operate under a sub-atmospheric or relatively low pressure, of the order of one-fourth to one-half atmosphere. This technique is particularly helpful in the numerous embodiments of the invention, for example, Examples I–V, and VII, wherein the boron trihydrocarbon product is normally a gas at the temperature of operation. Hence, continuous evacuation of the reaction zone vapor space, to withdraw the boron trihydrocarbon product, results in its removal from the reaction zone promptly and prevents further interreaction of said boron product with excess aluminum trihydrocarbon product present in certain cases.

As a further variant on the reaction technique, in certain instances it will be desirable to pass an inert gas through the reacting mixture as a stripping agent. Again, this technique is of particular utility in cases wherein an excess aluminum trihydrocarbon reactant, having different hydrocarbon radicals than the alkali metal boron tetrahydrocarbon complex reactant, is employed. By utilizing an inert gas, the boron trihydrocarbon product, having radicals corresponding to the initial complex, is rapidly removed, substantially as quickly as formed, from contact with the other reactants, and in particular with excess aluminum reactant. Thus, in Example III, wherein the aluminum reactant is aluminum trimethyl and the boron reactant is sodium boron tetraethyl, passing a stream of argon, nitrogen, or helium through the reacting mixture facilitates removal of boron triethyl from the system as rapidly as it is formed, hence preventing any further exchange of the ethyl groups with the methyl groups of temporarily excess aluminum trimethyl.

As clear from the examples above and the preceding discussion, there is no rigorous requirement on the precise molar proportions of boron and aluminum reactants present at any particular time. The ratio of the reactants present at reacting conditions at any particular time has an influence on the product compositions obtained when more than one hydrocarbon radical is involved in the reactants. When only minor concentrations of the aluminum reactant are present, there is little opportunity for interreaction and hydrocarbon radical exchange to occur between the boron trihydrocarbon product initially released and excess aluminum trihydrocarbon reactant. On the other hand, when a complete reaction batch is prepared and the reaction zone is initially charged with a substantial molar excess of the aluminum trihydrocarbon, there is considerably more opportunity for the boron trihydrocarbon, released by the present process, to react with excess aluminum trihydrocarbon reactant. The proportions of reactants, as well as the conditions of operation, thus provide the means whereby product compositions are readily adjusted. When sodium boron tetraethyl is reacted with aluminum tri-n-propyl, for example, the sodium aluminum tetraalkyl complex compound can include varied proportions of sodium aluminum tetrapropyl, sodium aluminum tetraethyl, and the mixed-alkyl complexes, viz., the propyl triethyl, dipropyl diethyl, and tripropyl ethyl compounds. To achieve a higher degree of propyl radical on the boron trialkyl compound released, the aluminum tripropyl feed material is used in further excess, and a longer contact time is provided.

The process is sometimes most effectively carried out in the presence of various solvent materials as reaction media or solvating agents. This is particularly the case in instances wherein the aluminum reactant or the boron trihydrocarbon product desired is normally a high melting or high boiling liquid. Thus, when the aluminum reactant or the boron product is a triaryl or tri-substituted aryl compound, the use of thermally stable, high boiling aromatic liquid reaction media is highly desirable. Examples of such liquids are biphenyl, xylene, toluene, naphthalene, dicahydronaphthalene, and other well known liquid aromatics. Generally, the boron complex reactants are at least slightly soluble in these solvents, sufficient to the extent that reaction is thereby facilitated. Further, the aluminum trihydrocarbon and the boron trihydrocarbon reactant and product, respectively, are similarly at least partly soluble in such liquids, thus allowing ready removal from unreacted solid components of a reaction system. In these cases, further recovery operations will be required to achieve a separation of a desired relatively pure boron trihydrocarbon compound.

As illustrated in Example IX, one of the particularly useful embodiments of the present invention involves the selective reaction of an aluminum trihydrocarbon component in admixture with, and solution in, another organometallic liquid. Illustrative systems, to which this treatment is effectively applicable, include mixtures of aluminum trihydrocarbon compounds—most frequently, aluminum trialkyls—with tin, zinc, bismuth and antimony organometallics. For example when a mixture of tin tetraethyl-aluminum triethyl, in proportions of about 1 to 2 parts by weight, is treated with an alkali-metal boron tetraethyl compound, as in Example IX, similar select reaction of the aluminum component is achieved. The aluminum triethyl is converted to a desirable, readily recoverable solid complex compound, and the tin tetraalkyl is also thus recoverable in purified form. In these embodiments of the invention, the second component of the initial mixture, that is, the non-aluminum metal-organic, should be non-reactive with the alkali metal-boron tetrahydrocarbon complex reactant.

The alkali metal aluminum tetrahydrocarbon products produced by the reaction of the present invention are useful as alkylating agents in producing organometallic compounds of other metals, for example by reacting such complexes with compounds such as lead oxides, sulfides or halides to form a corresponding lead tetrahydrocarbon material. The complexes are also employed as electrolyte components for electrolytic processes, for analytical reagents, and for other purposes. The boron trihydrocarbon materials jointly released in the process are valuable for similar purposes, as components of high energy fuel compositions, spontaneously ignitable materials, and for other purposes.

Having fully described the present invention and the manner of its operation, what is claimed is:

We claim:

1. Process of reacting together an alkali metal-boron tetrahydrocarbon complex compound and an aluminum trihydrocarbon compound and forming an alkali metal aluminum tetrahydrocarbon complex and a boron trihydrocarbon compound, the hydrocarbon radicals of said compounds consisting of carbon and hydrogen and being selected from the group consisting of alkyl, aryl, alkaryl, and aralkyl.

2. The process of claim 1 further defined in that the boron trihydrocarbon compound is vaporizable and is removed from the alkali metal aluminum tetrahydrocarbon complex by vaporization from the reaction.

3. The process of claim 1 further defined in that the boron trihydrocarbon compound is removed from the alkali metal aluminum tetrahydrocarbon complex by solution in an inert solvent therefor.

4. In a process of separating a mixture of a liquid organometallic compound and a trihydrocarbon aluminum compound dissolved therein, the improvement comprising treating said mixture with an alkali metal boron tetrahydrocarbon complex which is inert to the said liquid organometallic compound but which reacts with the trihydrocarbon aluminum compound, and thereby selectively reacting the trihydrocarbon aluminum compound of the original mixture and forming thereby an alkali metal-aluminum tetrahydrocarbon complex insoluble in said liquid organometallic compound, and a boron trihydrocarbon compound, the hydrocarbon radicals of the aluminum and boron compounds consisting of carbon and hydrogen and being selected from the group consisting of alkyl, aryl, alkaryl and aralkyl.

5. The process of separating a mixture of tetraethyllead and triethyl aluminum comprising treating said mixture with sodium boron tetraethyl in proportions of about one mole per mole of the triethyl aluminum, and thereby selectively reacting the triethyl aluminum and forming sodium aluminum tetraethyl and precipitating from the tetraethyllead, and triethyl boron, vaporizing the triethyl boron and separating the liquid tetraethyllead and the precipitated sodium aluminum tetraethyl.

References Cited in the file of this patent

FOREIGN PATENTS 1,057,600 Germany _____ May 21, 1959

OTHER REFERENCES

Article by Zakharkin et al. in Izvestiya Akad. Nauk S.S.S.R. 1959, No. 1, p. 181. Photocopy of original and 3 page English abstract thereof (SOV/62–59–1–37/38).